(12) United States Patent
Ohira

(10) Patent No.: US 8,976,414 B2
(45) Date of Patent: Mar. 10, 2015

(54) IMAGE PROCESSING METHOD, IMAGE PROCESSING APPARATUS AND IMAGE FORMING APPARATUS INCLUDING THE SAME, IMAGE READING APPARATUS, AND RECORDING MEDIUM

(71) Applicant: Masakazu Ohira, Osaka (JP)

(72) Inventor: Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 33 days.

(21) Appl. No.: 13/683,634

(22) Filed: Nov. 21, 2012

(65) Prior Publication Data
US 2013/0135637 A1 May 30, 2013

(30) Foreign Application Priority Data
Nov. 28, 2011 (JP) .................................. 2011-259622

(51) Int. Cl.
G06F 15/00 (2006.01)
G06K 1/00 (2006.01)
G06T 5/00 (2006.01)

(52) U.S. Cl.
CPC ................. *G06T 5/002* (2013.01); *G06T 5/005* (2013.01); *G06T 2207/10008* (2013.01); *G06T 2207/30176* (2013.01)
USPC ........................................................ 358/1.9

(58) Field of Classification Search
None
See application file for complete search history.

(56) References Cited

U.S. PATENT DOCUMENTS

| 6,654,495 B1 * | 11/2003 | Katoh et al. ................... 382/178 |
| 8,503,036 B2 * | 8/2013 | Cassidy et al. ............... 358/3.26 |
| 2005/0185224 A1 * | 8/2005 | Yoshizawa ................... 358/3.26 |

FOREIGN PATENT DOCUMENTS

| JP | 2002-232708 A | 8/2002 |
| JP | 2003-198838 A | 7/2003 |
| JP | 2006-332785 A | 12/2006 |

* cited by examiner

*Primary Examiner* — Vincent Rudolph
*Assistant Examiner* — Michael Burleson
(74) *Attorney, Agent, or Firm* — Birch, Stewart, Kolasch & Birch, LLP

(57) ABSTRACT

An image processing apparatus includes: a line noise detection section for detecting line noise pixels included in input image data; a segmentation process section for determining a pixel in a text region; and a line noise removal process section for (i) determining a replacement-target line noise pixel by excepting, from the line noise pixels, the pixel in the text region and a pixel within a first distance from the pixel in the text region and (ii) replacing the replacement-target line noise pixel with another pixel other than the line noise pixels, which another pixel is included in the input image data.

10 Claims, 13 Drawing Sheets

Line Noise Is Removed

Line Noise Is Removed

Line Noise Is Removed

IMAGE PROCESSING METHOD, IMAGE PROCESSING APPARATUS AND IMAGE FORMING APPARATUS INCLUDING THE SAME, IMAGE READING APPARATUS, AND RECORDING MEDIUM

This Nonprovisional application claims priority under 35 U.S.C. §119 on Patent Application No. 2011-259622 filed in Japan on Nov. 28, 2011, the entire contents of which are hereby incorporated by reference.

TECHNICAL FIELD

The present invention relates to an image processing method, an image processing apparatus and an image forming apparatus including the image processing apparatus, an image reading apparatus, and a recording medium, each of which removes line noise from image data.

BACKGROUND ART

An image forming apparatus such as a copying machine or a multifunction peripheral usually has a scanner function, by which to read an image of a document sheet. Such an image forming apparatus prints the image based on read image data, and/or transmits the read image data to another apparatus. Meanwhile, for user friendliness, reading of an image of a document sheet is carried out by the scanner function often with use of an auto document feeder (ADF).

Assume that an image of a document sheet is read with use of an auto document feeder. In this case, if there is dust or paper dust on a glass surface on a path of light for reading the document sheet, read image data will have line noise that is parallel to a sub scanning direction (such an image is referred to as a line noise image). Such line noise is visually noticeable, and therefore is desirably removed for the purpose of obtaining image data that is the same as the image of the document sheet.

Patent Literature 1 discloses a technique to remove line noise. According to this technique, pixel values of pixels constituting line noise in image data are replaced with pixel values found by linear interpolation from pixel values of neighboring pixels. Specifically, (i) a noise region is detected in input image data, (ii) correction pixel values to correct pixels in the noise region are found by linear interpolation from pixel values of pixels adjacent to a detected noise region, and (iii) the pixel values of the pixels in the noise region are replaced with found correction pixel values.

However, the technique described in Patent Literature 1 has the following problem. In a case where the line noise overlaps a texture such as halftone dots, the line noise remains unremoved because a replaced portion differs from the surrounding texture (see FIG. 14). FIG. 14 is an explanatory view showing a problem of a conventional line noise removal process disclosed in Patent Literature 1.

On the other hand, Patent Literature 2 proposes a technique to solve such a problem. Specifically, the technique described in Patent Literature 2 is a technique of replacing pixels in a line noise portion by a method allowing reproduction of a texture. That is, this technique is arranged to replace, pixels in a region to be replaced, with pixels in a region that is highly similar to pixels around the region to be replaced. According to such an arrangement, it is possible to remove line noise without leaving an unusual-looking portion in the texture, even in the case where the line noise overlaps a halftone dot region as described earlier (see FIG. 15). FIG. 15 is an explanatory view showing a conventional line noise removal process disclosed in Patent Literature 2.

CITATION LIST

Patent Literatures

Patent Literature 1
Japanese Patent Application Publication, Tokukai, No. 2003-198838 A (Publication Date: Jul. 11, 2003)
Patent Literature 2
Japanese Patent Application Publication, Tokukai, No. 2006-332785 A (Publication Date: Dec. 7, 2006)
Patent Literature 3
Japanese Patent Application Publication, Tokukai, No. 2002-232708 A (Publication Date: Aug. 16, 2002)

SUMMARY OF INVENTION

Technical Problem

However, according to the technique described in Patent Literature 2, the replacement is carried out merely by choosing, on the basis of similarity, a pixel that seems most suitable for a pixel that is in a region to be replaced. Therefore, the technique is not capable of reproducing the edge shape of an original image. This leads to another problem that, in a case of an image whose edge has some meaning (e.g., in a case of a character), a poor edge shape is easy to recognize (see FIG. 16). FIG. 16 is an explanatory view showing a problem of a conventional line noise removal process disclosed in Patent Literature 2.

In view of the above problems, an object of the present invention is to provide an image processing method, an image processing apparatus and an image forming apparatus including the image processing apparatus, an image reading apparatus, and a recording medium, each of which is capable of preventing occurrence of a poor edge shape of a character when carrying out a line noise removal process.

Solution to Problem

In order to attain the above object, an image processing apparatus of the present invention includes: a line noise detection section for detecting line noise pixels included in input image data; a segmentation process section for determining at least a pixel in a text region of the input image data; and a line noise removal process section for (i) determining an replacement-target line noise pixel by excepting, from the line noise pixels, the pixel in the text region and a pixel within a first distance from the pixel in the text region and (ii) replacing the replacement-target line noise pixel with another pixel other than the line noise pixels, which another pixel is included in the input image data.

Advantageous Effects of Invention

According to a configuration of the present invention, it is possible to prevent occurrence of a poor edge shape of a character when carrying out a process of removing line noise pixels (line noise) included in input image data.

Figure 3:
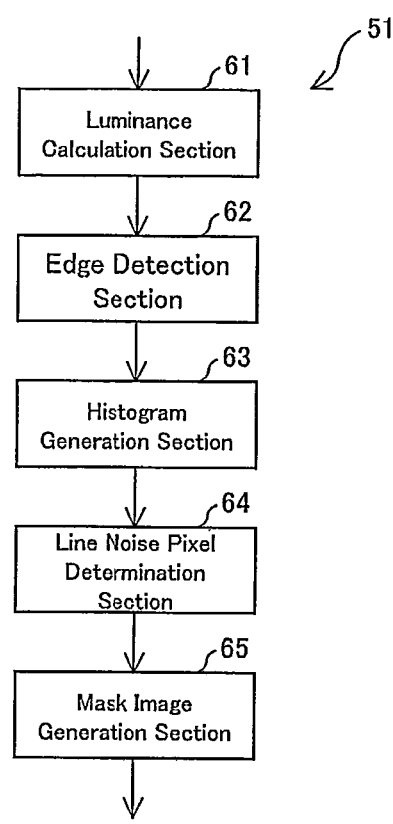
FIG. 3 is a block diagram illustrating a configuration of a line noise detection section shown in FIG. 2.
Figure 6:
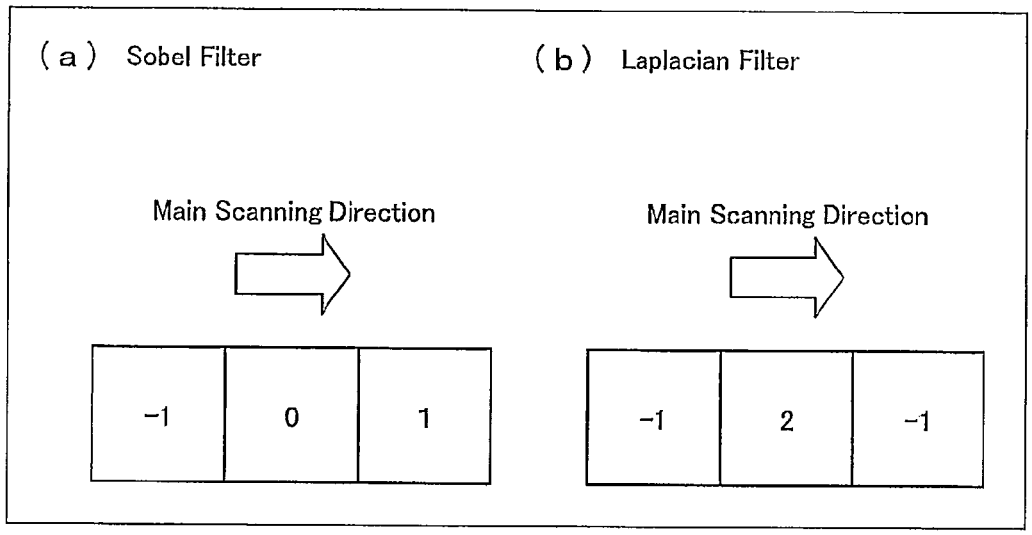

(a) of FIG. 6 is an explanatory view illustrating a Sobel filter for use in an edge detection section shown in FIG. 3. (b) of FIG. 6 is an explanatory view illustrating a Laplacian filter for use in the edge detection section.

Figure 7:
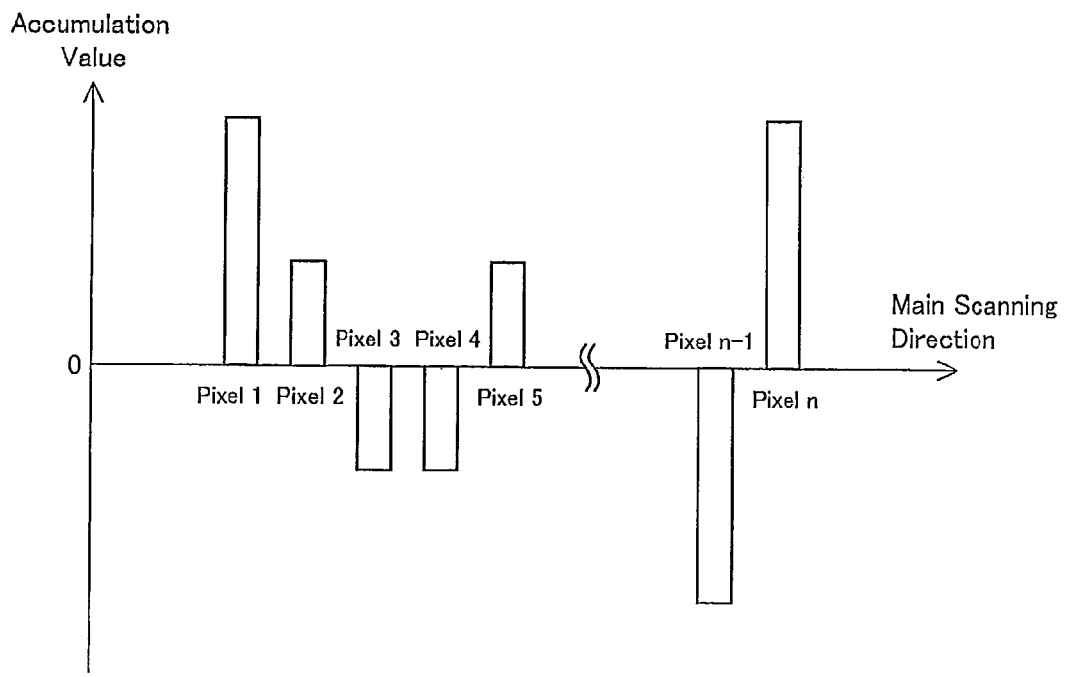

FIG. 7 is an explanatory view, which is about the edge detection section and an edge information histogram generation section shown in FIG. 3, illustrating an example of a histogram generated by the edge information histogram generation section on the basis of edge information calculated by the edge detection section.

Figure 8:
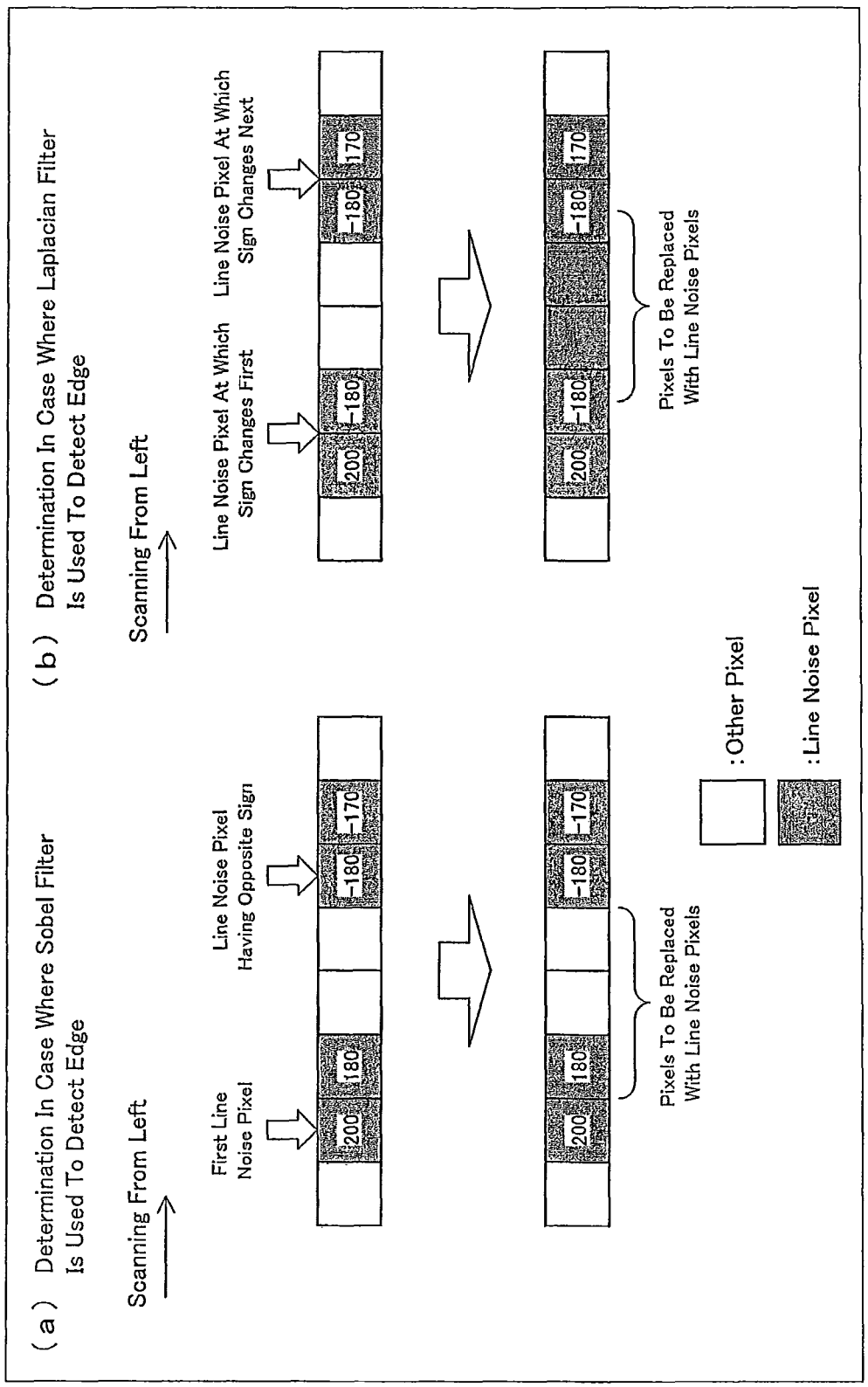

(a) of FIG. 8 is an explanatory view showing an operation of determining a line noise pixel by a line noise pixel determination section shown in FIG. 3, observed in a case where a Sobel filter is used. (b) of FIG. 8 is an explanatory view showing an operation of determining a line noise pixel by the line noise pixel determination section, observed in a case where a Laplacian filter is used.

Figure 9:
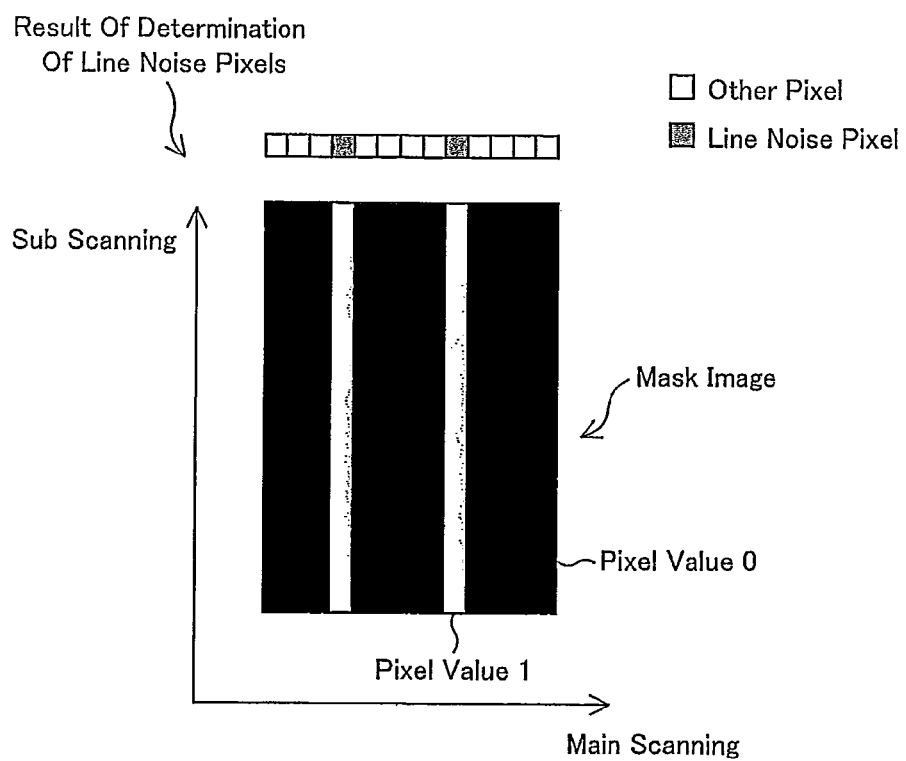

FIG. 9 is an explanatory view showing mask image data generated by a mask image generation section shown in FIG. 3.

Figure 10:
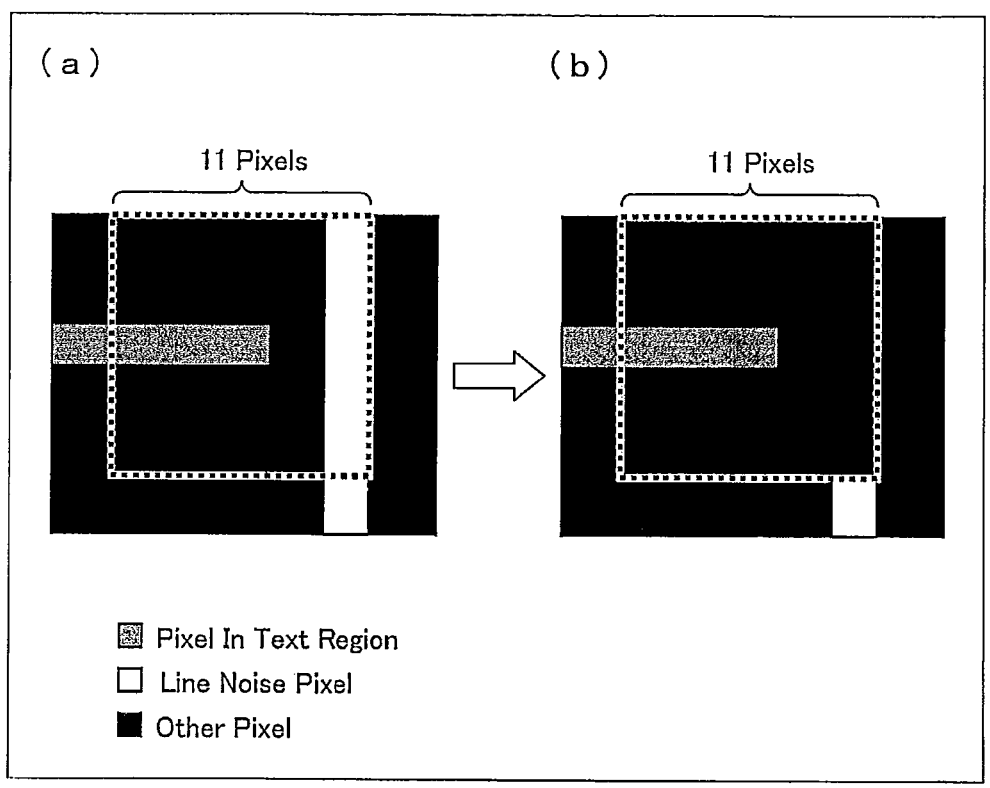

(a) of FIG. 10 is an explanatory view showing an example of mask image data generated by the mask image generation section shown in FIG. 3. (b) of FIG. 10 is an explanatory view showing an example of a line noise replacement mask generated from the mask image data shown in (a) of FIG. 10.

Figure 2:
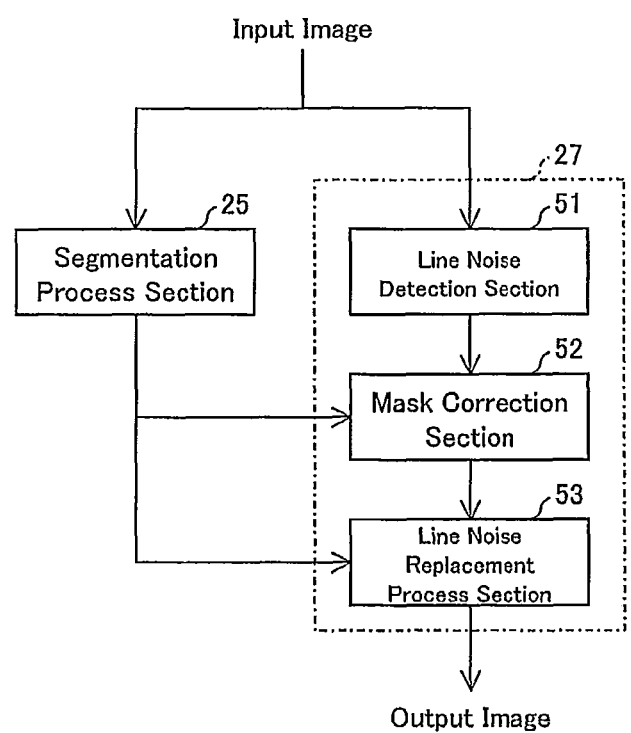
FIG. 2 is a block diagram illustrating a configuration of a line noise removal section shown in FIG. 1.
Figure 11:
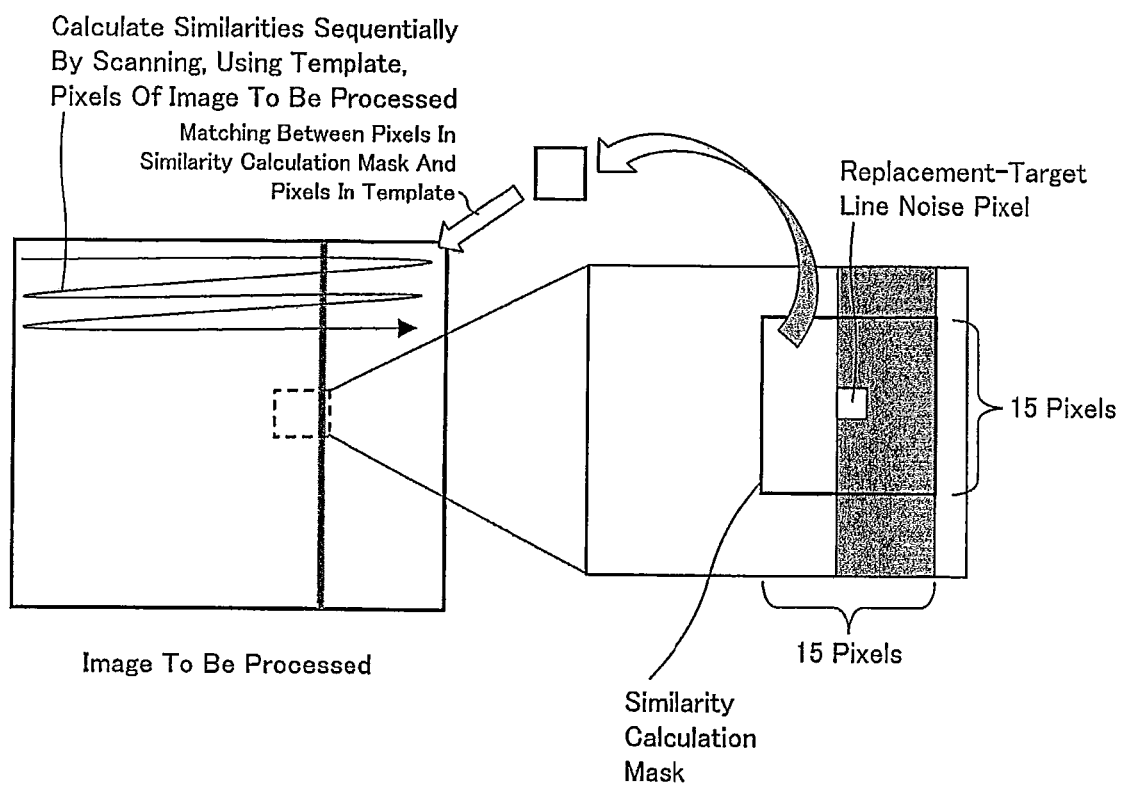

FIG. 11 is an explanatory view showing an operation of a line noise replacement process section shown in FIG. 2.

Figure 12:
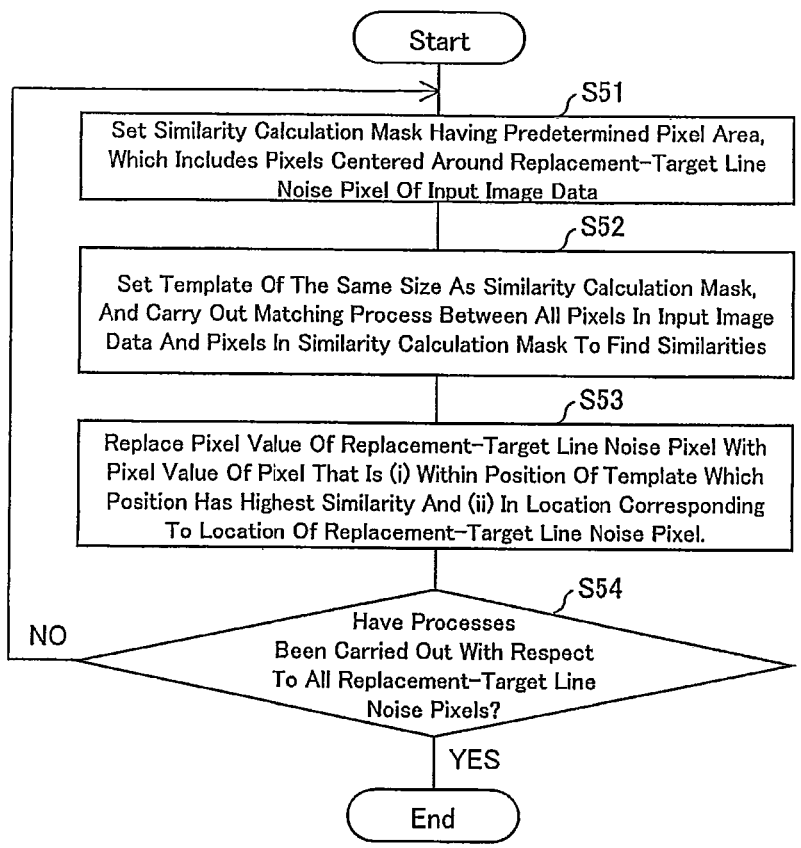

FIG. 12 is a flowchart showing an operation of the line noise replacement process section shown in FIG. 2.

Figure 1:
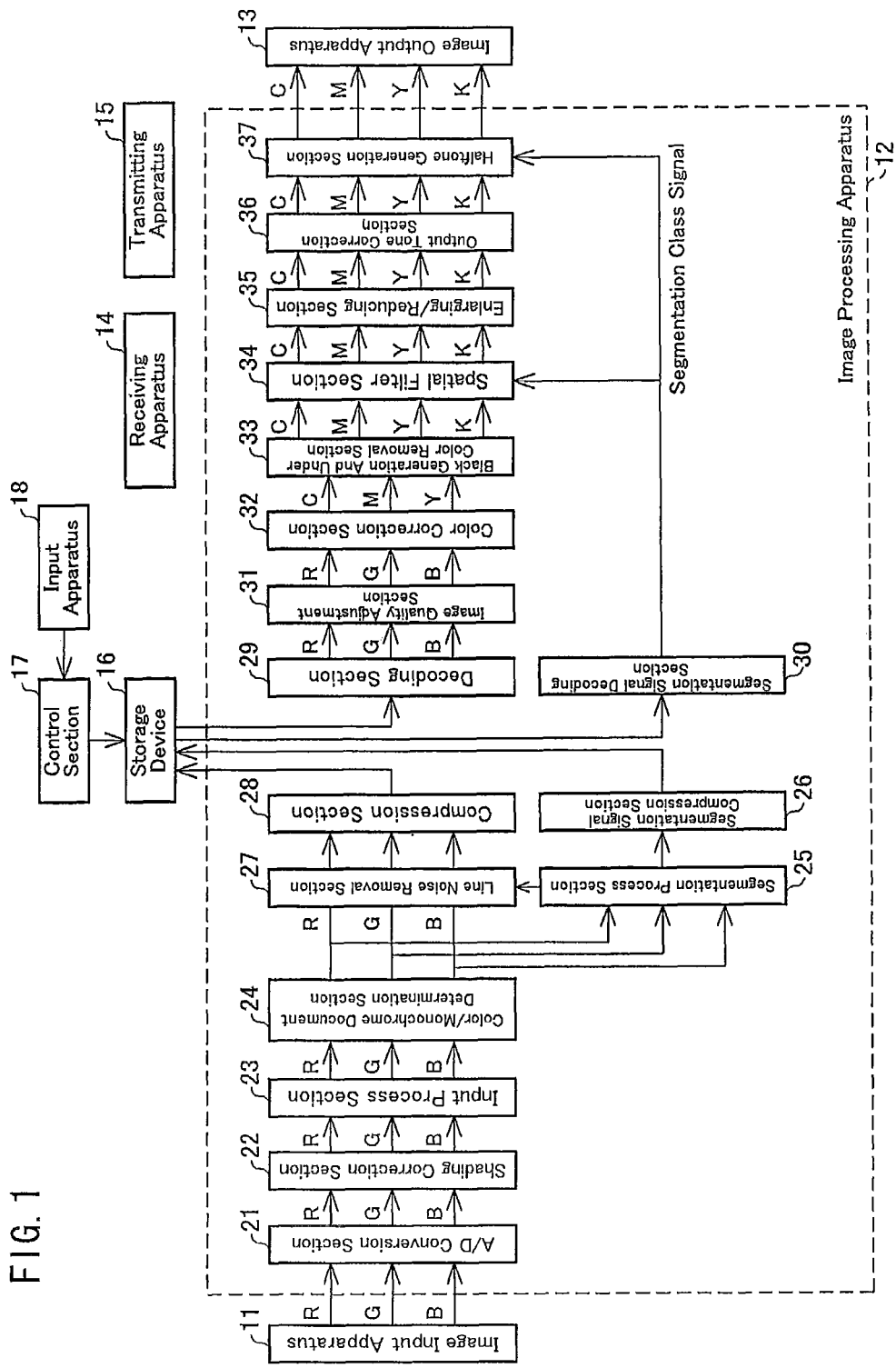
FIG. 1 is a block diagram schematically illustrating a configuration of an image forming apparatus which includes an image processing apparatus of an embodiment of the present invention.
Figure 13:
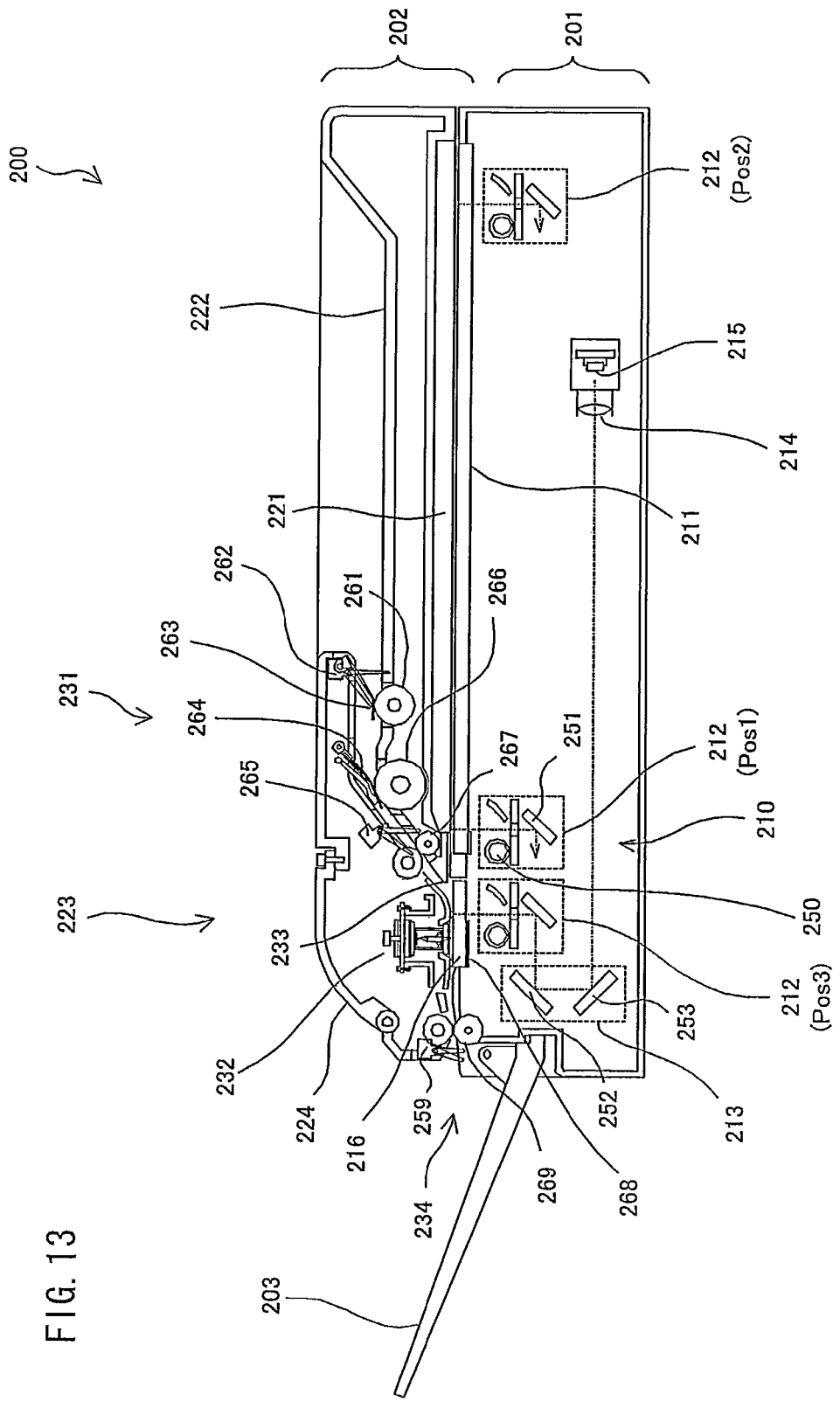

FIG. 13 is a longitudinal cross sectional view schematically illustrating a structure of a document feed double-side reading apparatus serving as an image input apparatus shown in FIG. 1.

Figure 14:
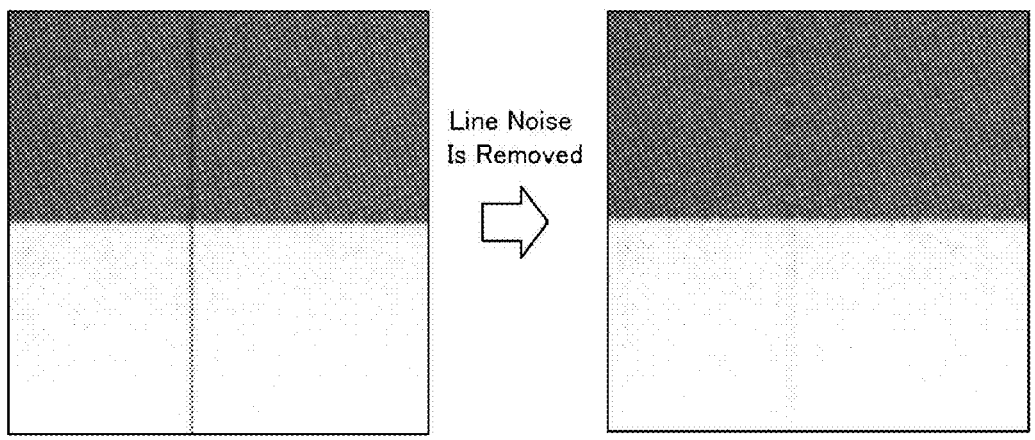

FIG. 14 is an explanatory view showing a problem of a conventional line noise removal process disclosed in Patent Literature 1.

Figure 15:
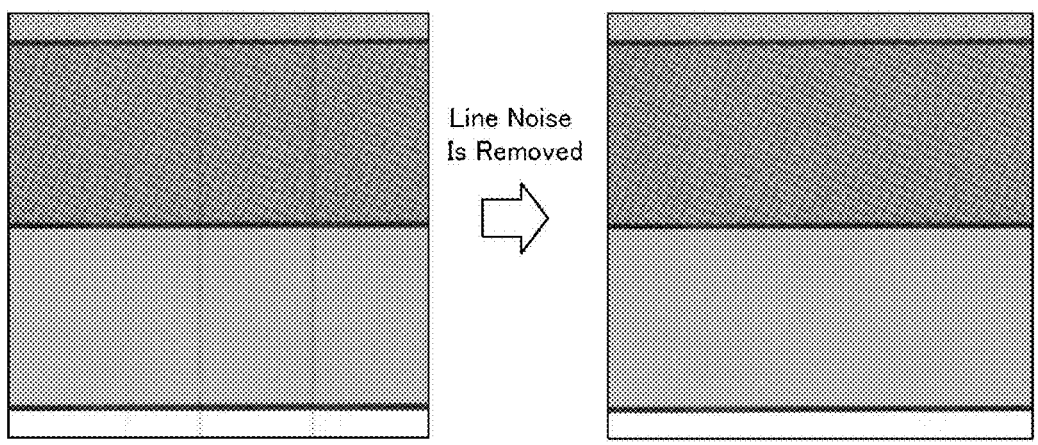

FIG. 15 is an explanatory view showing a conventional line noise removal process disclosed in FIG. 2.

Figure 16:
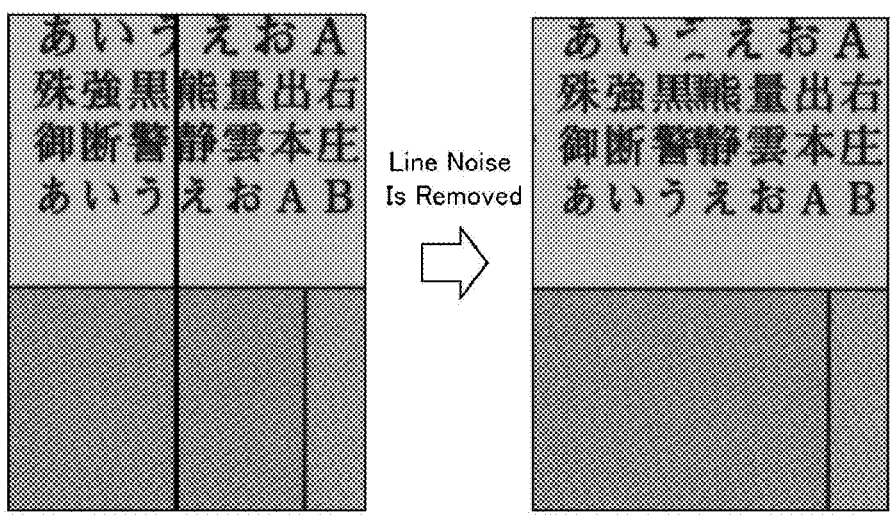

FIG. 16 is an explanatory view showing a problem of a conventional line noise removal process disclosed in Patent Literature 3.

DESCRIPTION OF EMBODIMENTS

The following description will discuss embodiments of the present invention with reference to the drawings.

(Image Forming Apparatus)

FIG. 1 is a block diagram schematically illustrating a configuration of an image forming apparatus which includes an image processing apparatus of an embodiment of the present invention.

The image forming apparatus of the present embodiment is a digital color multifunction peripheral that is capable of operating in a copy mode, a print mode, a fax transmitting mode, a fax receiving mode and an image transmitting mode. The image forming apparatus is configured to operate in a selected mode when any of the above modes is selected by for example a user.

The copy mode is a mode in which the image forming apparatus reads image data (i.e., reads a document and generates image data) and prints an image of the image data on a sheet. The print mode is a mode in which the image forming apparatus prints, on a sheet, an image of image data received from a terminal device connected thereto.

The fax transmitting mode includes (1) a normal fax mode in which the image forming apparatus transmits, to an external device over telephone lines, image data obtained by reading a document and (2) an internet fax mode in which the image forming apparatus sends an e-mail accompanied by the image data over the Internet. The fax receiving mode is a mode in which the image forming apparatus receives image data from an external device by fax and prints, on a sheet, an image of received image data.

The image transmitting mode includes (1) a mode (scan to e-mail mode) in which the image forming apparatus sends, to a given address, an e-mail accompanied by image data obtained by reading a document, (2) a mode (scan to ftp mode) in which the image forming apparatus transmits, to a folder specified by a user, image data generated by reading a document and (3) a mode (scan to USB mode) in which the image forming apparatus transmits, to a USB flash drive etc. inserted therein, image data obtained by reading a document.

Note that, according to the present embodiment, the fax transmitting mode and the image transmitting mode are each subclassified as above according to image processing operations.

Furthermore, the image forming apparatus is configured such that, in a case where the image forming apparatus is in the copy mode or the print mode, a user can select (i) a monochrome mode for outputting a monochrome image or (ii) a full-color mode for outputting a full-color image.

Moreover, according to the present embodiment, an automatic document color selection mode can be set. When the image forming apparatus is in the automatic document color selection mode, the image forming apparatus carries out a color/monochrome document determination process to determine whether a document is a color document or a monochrome document. The image forming apparatus is configured to (i) carry out an output process in the full-color mode if it is determined that the document is a color document and (ii) carry out an output process in the monochrome mode if it is determined that the document is a monochrome document.

As illustrated in FIG. 1, the image forming apparatus includes an image input apparatus (image reading apparatus) 11, an image processing apparatus 12, an image output apparatus (printing apparatus) 13, a receiving apparatus 14, a transmitting apparatus 15, a storage device 16, a control section 17 and an input apparatus 18.

The image input apparatus 11 serves as an auto document feeder (ADF). While the image input apparatus 11 is in the copy mode, the fax transmitting mode or the image transmitting mode, the image input apparatus 11 reads a document and generates read image data. Specifically, the image input apparatus 11 includes a scanner section that includes a charge coupled device (CCD), and is configured to (i) feed a document sheet to a read position by the ADF function, (ii) convert light reflected from the document sheet into electric signals (analogue image signals) which are R, G, B color signals and (iii) supplies the electric signals to the image processing apparatus 12.

The image input apparatus 11 reads a document image in full color, regardless of which of the full-color and monochrome modes is selected. Furthermore, the image input apparatus 11 reads a document image in full color even in a case where the foregoing automatic document color selection process is carried out by the image processing apparatus 12.

The image processing apparatus 12 is an integrated circuit which carries out image processing with respect to image data (image signal), and is constituted by for example an application specific integrated circuit (ASIC). As illustrated in FIG. 1, the image processing apparatus 12 includes blocks of: an A/D (analog-to-digital) conversion section 21; a shading correction section 22; an input process section 23; a color/monochrome document determination section 24; a segmentation process section 25; a segmentation signal compression (encoding) section 26; a line noise removal section 27; a compression (encoding) section 28; a decoding section 29; a segmentation signal decoding section 30, an image quality adjustment section 31; a color correction section 32; a black generation and under color removal section 33; a spatial filter section 34; an enlarging/reducing (zooming) section 35; an output tone correction section 36; and a halftone generation section 37. The processes carried out by the respective blocks of the image processing apparatus 12 are described later in detail.

While the image processing apparatus 12 is in the copy mode, the fax transmitting mode or the image transmitting mode, the image processing apparatus 12 carries out image processing with respect to image data received from the image input apparatus 11. While the image processing apparatus 12 is in the print mode, the image processing apparatus 12 carries out image processing with respect to image data received from a terminal device (not illustrated) connected thereto. While the image processing apparatus 12 is in the fax receiving mode, the image processing apparatus 12 carries out image processing with respect to image data received from an external device (not illustrated).

Furthermore, while the image processing apparatus 12 is in the copy mode, the print mode or the fax receiving mode, the image processing apparatus 12 transmits, to the image output apparatus 13, image data that has been subjected to image processing. While the image processing apparatus 12 is in the fax transmitting mode, the image processing apparatus 12 transmits, to the transmitting apparatus 15, image data that has been subjected to image processing. While the image processing apparatus 12 is in the scan to e-mail mode of the image transmitting mode, the section (not illustrated), image data that has been subjected to image processing. While the image processing apparatus is in the scan to ftp mode, the image processing apparatus 12 transmits, to a specified folder, image data that has been subjected to image processing. While the image processing apparatus 12 is in the scan to USB mode, the image processing apparatus 12 transmits, to a specified USB flash drive, image data that has been subjected to image processing.

The image output apparatus 13 prints (i.e., forms an image), on a sheet such as a piece of paper, an image of image data received from the image processing apparatus 12. That is, the image output apparatus 13 is for example a color printer which employs an electrophotographic method or an ink-jet method. Note in the present embodiment that the "printing" means printing in the print mode, printing in the copy mode or printing in the fax receiving mode. The image output apparatus 13 can be a display apparatus which displays an image of image data.

The receiving apparatus 14 is connected to telephone lines or the Internet, and receives image data from an external device by fax. The transmitting apparatus 15 is connected to telephone lines or the Internet, and transmits, to an external device by fax, image data supplied from the image input apparatus 11. The storage device 16 is for temporarily storing therein image data which is processed by the image processing apparatus 12, and is for example a hard disk drive.

The control section 17 is a computer which includes a processor such as a central processing unit (CPU) or a digital signal processor (DSP), and controls hardware devices of the image forming apparatus as a whole. The control section 17 also serves to control data transmission between the hardware devices of the image forming apparatus.

The input apparatus 18 includes for example a touch screen liquid crystal panel serving as a display section. From the input apparatus 18, a user carries out various input operations with respect to the image processing apparatus 12 (i.e., the image forming apparatus). The input apparatus 18 is usually an operation panel.

In the image processing apparatus 12, the A/D (analog-to-digital) conversion section 21 converts color image signals (RGB analog signals) received from the image input apparatus 11 into digital image data (RGB digital signals). The shading correction section 22 carries out, with respect to the image data received from the A/D conversion section 21, a process to eliminate various distortions which could be generated in an illumination system, an image focusing system and/or an image sensing system of the image input apparatus 11. The input process section 23 carries out a tone conversion process such as γ correction with respect to each piece of RGB image data received from the shading correction section 22.

The color/monochrome document determination section 24 determines, with use of the RGB signals supplied from the input process section 23, whether the read image data is data of a color document or data of a monochrome (black-and-white) document. Note that, instead of the color/monochrome document determination section 24, a document type determining section can be provided which determines the type of a document. Examples of the type of a document include a text document, a printed-picture (halftone photograph) document, a photograph (continuous tone photograph) document, a text/printed-picture document which includes both a text and a printed-picture, and a text/photograph (continuous tone photograph) document which includes both a text and a photograph. In this case, the document type determining section can be configured to carry out, as well as the document type determination, an automatic color selection process to determine whether a read document is a color document or a monochrome (black-and-white) document. The document type determining section can be configured to further carry out a blank page determination process to determine whether or not a document is a blank page document.

The segmentation process section 25 determines, on the basis of the RGB image data received from the color/monochrome document determination section 24, to which pixel region each pixel of input image data (the read image data) is to be classified. The segmentation process section 25 then generates a segmentation class signal indicative of a result of the determination. Examples of the image regions determined by the segmentation process section 25 include a black text region, a color text region and a halftone dot region.

The segmentation signal compression section 26 carries out a compression process with respect to the segmentation class signal generated for each pixel by the segmentation process section 25. Note that the segmentation signal compression section 26 carries out the compression process by for example a modified modified reed (MMR) method or a modified reed (MR) method, which are lossless compression methods.

The line noise removal section 27 (i) detects line noise in the input image data and (ii) removes the line noise with use of information about a text region detected by the segmentation process section 25 and a result of detection of the line noise.

The compression section 28 encodes the image data (RGB signals) supplied from the color/monochrome document determination section 24. Note here that the encoding is carried out according to for example the joint photographic experts group (JPEG) method.

The control section 17 temporarily stores, in the storage device 16, an encoded code (encoded image data) supplied from the compression section 28 and a segmentation class signal code (compressed segmentation class signal) supplied from the segmentation signal compression section 26, and manages them as filing data. Then, upon reception of instructions of a copy output operation, the control section 17 reads out the encoded code and its corresponding segmentation class signal code from the storage device 16, and supplies the encoded code and the segmentation class signal code to the decoding section 29 and the segmentation signal decoding section 30, respectively.

The control section 17 writes, to a management table in the storage device 16, (i) an address where the encoded code is stored or a data name of the encoded code and (ii) an address where the segmentation class signal code is stored such that the address or the data name of the encoded code is associated with the address of the segmentation class signal code. That is, the control section 17 controls reading or writing of the encoded code and the segmentation class signal code on the basis of the management table.

The decoding section 29 carries out a decoding process with respect to the encoded code, thereby decompressing the encoded code to obtain RGB image data. The segmentation signal decoding section 30 carries out a decoding process with respect to the segmentation class signal code. A decoded segmentation class signal is supplied to the spatial filter section 34 and the halftone generation section 37. In each of the spatial filter section 34 and the halftone generation section 37, image processing corresponding to the type of an image region is selected.

The image quality adjustment section 31 detects a page background of the RGB image data received from the decoding section 29, and carries out a background removal correction with respect to the RGB data. The image quality adjustment section 31 further adjusts RGB balance (color adjustment, adjustment of entire color such as tincture of red and tincture of blue), brightness and sharpness, on the basis of setting information inputted by a user from the input apparatus 18 which is for example an operation panel.

The color correction section 32 carries out, while the image processing apparatus 12 is in the full-color mode, a color correction process to convert RGB image data supplied from the image quality adjustment section 31 to CMY image data. The color correction section 32 further carries out, with respect to the CMY image data, a process to improve color reproduction. Such a color correction process is realized by (i) creating a LUT (lookup table) which stores input values (RGB) and their corresponding output values (CMY) and (ii) looking up an output value in the LUT.

The black generation and under color removal section 33 carries out, while the image processing apparatus 12 is in the full-color mode, a black generation to generate black (K) image data from the CMY image data supplied from the color correction section 32. The black generation and under color removal section 33 further generates another CMY image data by subtracting the black (K) image data from original CMY image data. In this way, the black generation and under color removal section 33 converts, while the image processing apparatus 12 is in the full-color mode, the CMY image data into four-color (CMYK) image data (see FIG. 1).

The spatial filter section 34 carries out, on the basis of the segmentation class signal, a spatial filter process (e.g., edge enhancement process, smoothing process) with the use of a digital filter with respect to the CMYK or CMY image data supplied from the black generation and under color removal section 33. That is, the spatial filter section 34 carries out, on the basis of a segmentation class signal, image processing that differs from image region to image region.

The enlarging/reducing section 35 enlarges or reduces an image, on the basis of an enlarging/reducing command (information indicative of zooming of an image to be printed) inputted by a user from an operation panel which serves as the input apparatus 18.

The output tone correction section 36 carries out, with respect to image data supplied from the enlarging/reducing section 35, an output γ correction to output the image data onto a sheet such as a piece of paper. The halftone generation section 37 carries out, by an error diffusion method or a dithering method, a tone reproduction process (halftone generation process) that is necessary for printing an image by the image output apparatus 13.

The CMYK or CMY image data outputted from the halftone generation section 37 is inputted to the image output apparatus 13. The image output apparatus 13 prints an image of the image data on a sheet such as a piece of paper.

(Configuration of Line Noise Removal Section)

The following description will discuss a configuration of the line noise removal section 27. FIG. 2 is a block diagram showing a configuration of the line noise removal section 27 shown in FIG. 1. As shown in FIG. 2, the line noise removal section 27 includes a line noise detection section (line noise removal process section) 51, a mask correction section (line noise removal process section) 52, and a line noise replacement process section (line noise removal process section) 53.

The line noise detection section 51 detects a line noise region in input image data, and supplies, to the mask correction section 52, a result of the detection (i.e., the region of line noise) as mask image data. The mask correction section 52 corrects, on the basis of information about a text region detected by the segmentation process section 25, the mask image data received from the line noise detection section 51. In this way, the mask correction section 52 generates a line noise replacement mask. The line noise replacement mask indicates replacement-target line noise pixels (line noise pixels to be replaced).

When generating the line noise replacement mask, the mask correction section 52 excepts, from the replacement-target line noise pixels, a pixel constituting line noise that is close to a text region.

FIG. 3 is a block diagram showing a configuration of the line noise detection section 51 shown in FIG. 2. As shown in FIG. 3, the line noise detection section 51 includes a luminance calculation section 61, an edge detection section determination section 64 and a mask image generation section 65. The functions and operations of these sections are described later.

The line noise replacement process section 53 carries out, with use of mask image data corrected by the mask correction section 52, a replacement process with respect to a pixel in the line noise region indicated by the mask image data. In this way, the line noise replacement process section 53 removes line noise from the input image data.

The following description discusses how the segmentation process section 25 and the line noise removal section 27 of the image processing apparatus 12 of the present embodiment operate in the above configuration.

(Operation of Segmentation Process Section)

Figure 4:
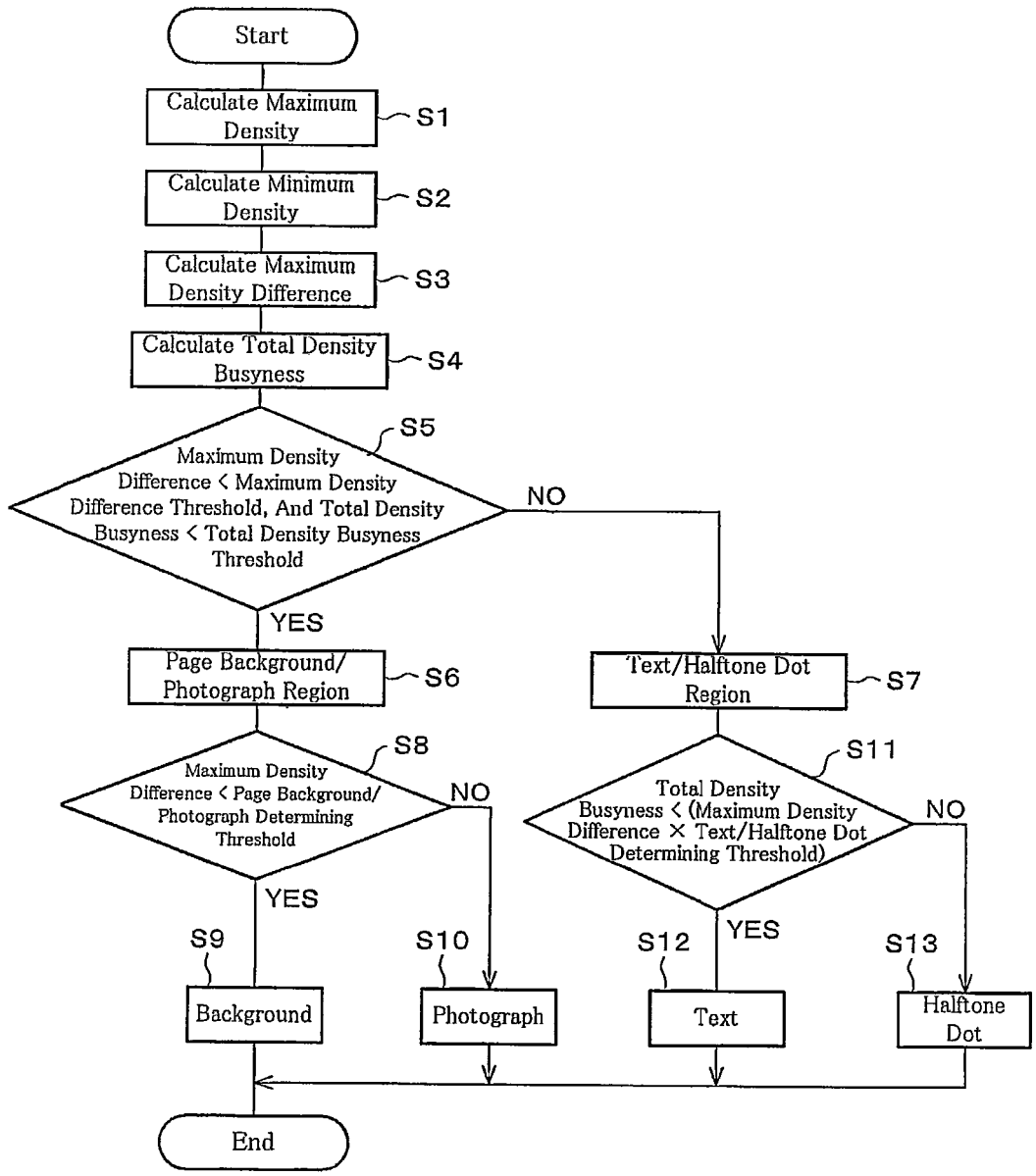
FIG. 4 is a flowchart showing an example of a segmentation process by a segmentation process section shown in FIG. 1.

First, the following describes the operation of the segmentation process section 25. The segmentation process section 25 extracts at least a text region from input image data. According to the present embodiment, the segmentation process section 25 classifies each pixel of the input image data into a region to which the each pixel belongs. This process can be carried out by for example the technique described in Japanese Patent Application Publication, Tokukai, No. 2002-232708 A. In a case where this technique is used, the each pixel of the input image data is classified into a "page background" region, a "photograph" region, a "text" region or a "halftone dot" region. The following description discusses an example of a segmentation process carried out by the segmentation process section 25. FIG. 4 is a flowchart showing an example of the segmentation process carried out by the segmentation process section 25.

As shown in FIG. 4, the segmentation process section 25 first calculates a maximum density (pixel value) and a minimum density of a block made up of n×m (e.g., 7×5) pixels including a target pixel (S1, S2). Next, the segmentation process section 25 calculates a maximum density difference which is defined by a difference between the maximum density and the minimum density (S3). The segmentation process section 25 further calculates a total density busyness, which is a total sum of absolute values of differences in densities between any adjacent two pixels (e.g., a total sum of absolute values calculated in a main scanning direction and absolute values calculated in a sub scanning direction) (S4).

Next, the segmentation process section 25 compares the maximum density difference with a maximum density difference threshold, and compares the total density busyness with a total density busyness threshold (S5). Note that the maximum density difference threshold and the total density busyness threshold are thresholds for determining, on the basis of the maximum density difference and the total density busyness, whether the target pixel is a pixel that belongs to a page background/photograph region or a text/halftone dot region.

If the comparison shows that the following conditions (A) and (B) are met: (A) the maximum density difference<the maximum density difference threshold and (B) the total density business<the total density busyness threshold, then the segmentation process section 25 determines that the target pixel belongs to the page background/photograph region (S6). On the other hand, if the comparison shows that the above conditions (A) and (B) are not met, then the segmentation process section 25 determines that the target pixel belongs to the text/halftone dot region (S7).

Next, the pixel determined to belong to the page background/photograph region is used as another target pixel. The segmentation process section 25 compares a maximum density difference found for the another target pixel with a page background/photograph determining threshold (S8). Note that the page background/photograph determining threshold is a threshold for determining, on the basis of the maximum density difference, whether the another target pixel is a page background pixel or a photograph (photograph region, continuous tone region) pixel.

If the comparison shows that the following condition is met: the maximum density difference<the page background/photograph determining threshold, then the segmentation process section 25 determines that the another target pixel is a page background pixel (S9). On the other hand, if the comparison shows that the above condition is not met, then the segmentation process section 25 determines that the another target pixel is a photograph (photograph region, continuous tone region) pixel (S10).

Furthermore, the pixel determined to belong to the text/halftone dot region is used as a further target pixel. The segmentation process section 25 compares a total density business calculated for the further target pixel with (the maximum density difference×a text/halftone dot determining threshold) (S11). Note that (the maximum density difference×a text/halftone dots determining threshold) is a threshold for determining, on the basis of the total density busyness, whether the further target pixel is a text pixel or a halftone dot pixel.

If the comparison shows that the following condition is met: the total density busyness<(the maximum density difference×a text/halftone dot determining threshold), then the segmentation process section 25 determines that the further target pixel is a text pixel (S12). On the other hand, if the comparison shows that the above condition is not met, then the segmentation process section 25 determines that the further target pixel is a halftone dot pixel (S13).

Note that the values of the maximum density difference threshold, the total density busyness threshold, the page background/photograph determining threshold and the text/halftone dot determining threshold are previously determined appropriately through experiments etc. Further note that, in the foregoing operations, out of the results (segmentation class signals) of the segmentation process by the segmentation process section 25, only the information about the text region is used. Note, however, that information about other regions is used in other image processing blocks such as the color correction section 32 and the spatial filter section 34.

(Operation of Line Noise Detection Section)

Figure 5:
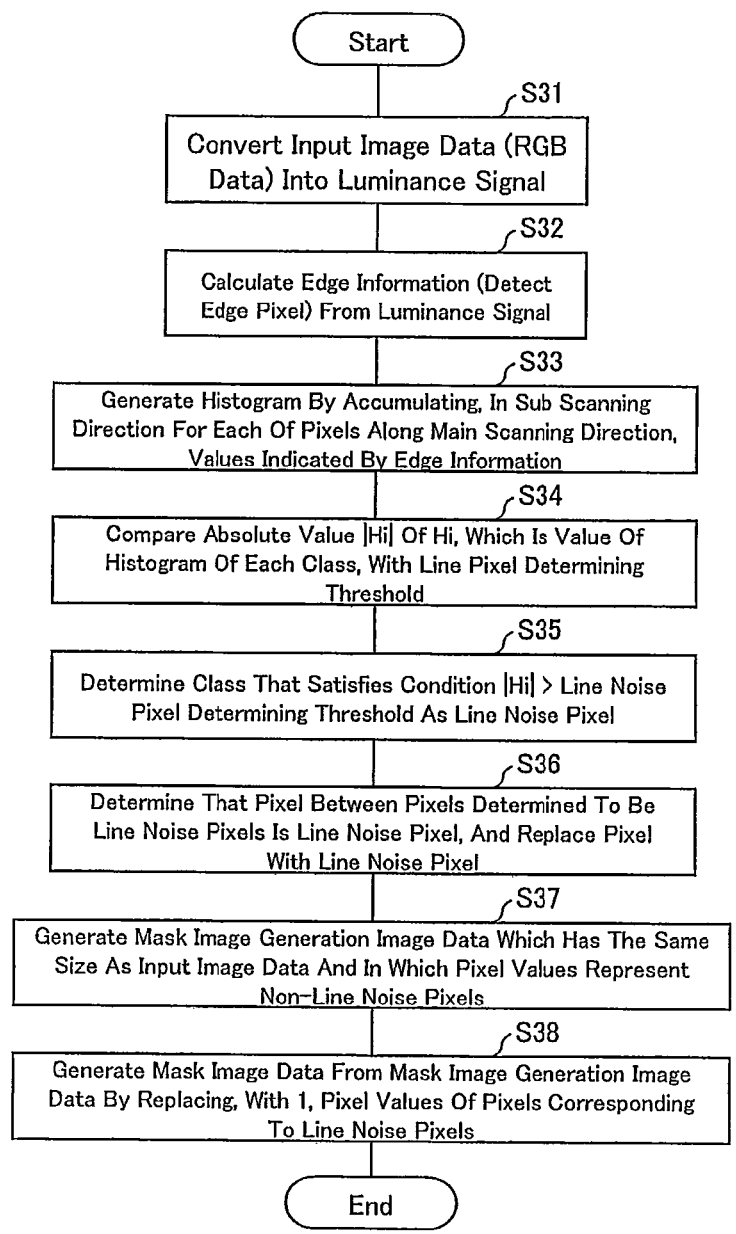
FIG. 5 is a flowchart showing an operation of the line noise detection section shown in FIG. 3.

The following description discusses an operation of the line noise detection section 51. The line noise detection section 51 detects a location of line noise, and outputs a result of detection as mask image data. The mask image data is for example bitmap data in which line noise pixels are each represented as 1 and the other pixels are each represented as 0. The following description discusses an example of a line noise detection process with reference to FIG. 3 and FIGS. 5 to 9. FIG. 5 is a flowchart showing the operation of the line noise detection section 51 shown in FIG. 3.

First, the luminance calculation section 61 converts RGB data (input image data) into a luminance signal by the following equation 1 (S31).

$$Yi = 0.30Ri + 0.59Gi + 0.11Bi \qquad \text{(Equation 1)}$$

wherein

Y is a luminance signal for each pixel,

R, G and B are values of color components of the each pixel, and the index i is a value added to the each pixel (i is an integer of 1 or greater).

The above conversion method is an example. The RGB signals can be converted into an L* signal of CIE 1976 L*a*b* signals (CIE: Commission International de l'Eclairage, L*: lightness, a* and b*: chromaticity). Alternatively, a G signal can be used.

Next, the edge detection section 62 calculates edge information (detects an edge pixel) from the luminance signal supplied from the luminance calculation section 61 (S32).

The detection of the edge pixel can be carried out by a known method. For example, a Sobel filter shown in (a) of FIG. 6 or a Laplacian filter shown in (b) of FIG. 6 can be used. (a) of FIG. 6 is an explanatory view of a Sobel filter for use in the edge detection section 62 shown in FIG. 3. (b) of FIG. 6 is an explanatory view of a Laplacian filter for use in the edge detection section 62 shown in FIG. 3.

(a) and (b) of FIG. 6 each illustrate an example of the edge detection section 62 which detects, by a one-dimensional filter process, mainly an edge (edge pixel) orthogonal to the main scanning direction. Another example of the edge detection section 62 is one that detects edge components in all directions by a two-dimensional filter process.

(a) and (b) of FIG. 6 each illustrate an example of edge detection which uses a mask of one pixel×three pixels, which targets only a target pixel and its adjacent pixels. Note, however, that the edge detection can be carried out with use of a larger mask of for example one pixel×seven pixels.

Next, the histogram generation section 63 accumulates, in the sub scanning direction for each of pixels along the main scanning direction, values indicated by the edge information calculated by the edge detection section 62. In this way, the histogram generation section 63 generates a histogram (see FIG. 7) (S33). FIG. 7 is an explanatory view of an example of a histogram that the edge information histogram generation section 63 generates on the basis of the edge information calculated by the edge detection section 62.

Note here that the values calculated by the edge detection section 62 are values with a negative or positive sign. That is, the sign is (i) positive in a case of an edge rising against the main scanning direction and (ii) negative in a case of an edge falling in the main scanning direction. Therefore, as shown in FIG. 7, the histogram generation section 63 accumulates, for each of the negative and positive signs, the values calculated by the edge detection section 62.

Next, the line noise pixel determination section 64 determines a line noise pixel (i.e., a pixel constituting line noise) from the histogram generated by the histogram generation section 63 (S34 to S36).

In this process, first, assuming that the value of the histogram of each class shown in FIG. 7 is Hi, |Hi| is compared with a line pixel determining threshold (S34). If the value of that class meets the condition of |Hi|>the line noise pixel determining threshold, then the class is determined to be a line noise pixel (S35). Note here that the line noise determining threshold is previously set appropriately through experiments etc. such that line noise is detected.

Next, the line noise pixel determination section 64 carries out a process shown in (a) of FIG. 8 or a process shown in (b) of FIG. 8, to thereby determine that a pixel, which is between pixels that have been determined in S35 to be line noise pixels, is a line noise pixel. Then, the line noise pixel determination section 64 replaces the pixel with a line noise pixel (S36).

In the present embodiment, the process shown in (a) of FIG. 8 is carried out in a case where a Sobel filter is used in the edge detection section 62. Alternatively, the process shown in (b) of FIG. 8 is carried out in a case where a Laplacian filter is used in the edge detection section 62. (a) of FIG. 8 is an explanatory view of operation of determining a line noise pixel in a case where the Sobel filter is used. (b) of FIG. 8 is an explanatory view of operation of determining a line noise pixel in a case where the Laplacian filter is used.

According to the process shown in (a) of FIG. 8, histograms of respective classes shown in FIG. 7 are scanned (checked) from left to right (i.e., in the main scanning direction), and a pixel, which is between (1) a first line noise pixel and (2) a second line noise pixel that has a sign opposite to that of the first line noise pixel, is replaced with a line noise pixel. That is, a pixel between the pixels (1) and (2) is changed to a line noise pixel. Note that the pixels determined to be line noise pixels in the process of S35 are left unchanged.

Next, a line noise pixel subsequent to a replaced line noise pixel is skipped, and a third line noise pixel is searched for. If the third line noise pixel is found, the same process as above is carried out to replace a pixel between the second and third line noise pixels with a line noise pixel. In this way, the above process is carried out with respect to all line noise pixels.

On the other hand, according to the process shown in (b) of FIG. 8, histograms of respective classes shown in FIG. 7 are scanned (checked) from left to right (i.e., in the main scanning direction), and a pixel, which is between (1) a first line noise pixel at which the sign first changes and (2) a second line noise pixel at which the sign changes next, is replaced with a line noise pixel (a pixel between the pixels (1) and (2) is changed to a line noise pixel).

Next, a line noise pixel subsequent to a replaced line noise pixel is skipped, and a third line noise pixel is searched for. If the third line noise pixel which has a different sign from that of the second line noise pixel is found by this process, the same process as above is carried out to replace a pixel between the second and third line noise pixels with a line noise pixel. In this way, the above process is carried out with respect to all line noise pixels.

The mask image generation section 65 generates mask image data of the same size as input image data (S37 and S38).

The mask image generation section 65 generates the mask image data in the following manner. First, the mask image generation section 65 generates image data for generating a mask image (hereinafter referred to as mask image generation image data), which has the same size as the input image data and in which pixel values represent non-line noise pixels (S37). In the mask image generation image data, for example line noise pixels are to be each represented as 1 (pixel value that represents a line noise pixel) and the other pixels are to be each represented as 0 (pixel value that represents a non-line noise pixel).

Next, the mask image generation section 65 changes the mask image generation image data as shown in FIG. 9, by replacing, with pixel values (e.g., 1) representing line noise pixels, pixel values of pixels that have been determined by the line noise pixel determination section 64 to be line noise pixels. In this way, the mask image generation section 65 generates mask image data (S38). FIG. 9 is an explanatory view of the mask image data generated by the mask image generation section 65.

(Operation of Mask Correction Section)

The mask correction section 52 corrects, on the basis of a text region signal generated by the segmentation process section 25, the mask image data generated by the mask image generation section 65 of the line noise detection section 51. In this way, the mask correction section 52 generates a final line noise replacement mask. The line noise replacement mask indicates line noise pixels to be replaced (replacement-target line noise pixels) when line noise included in the input image data is to be removed.

Specifically, the mask correction section 52 generates a line noise replacement mask arranged such that (i) a line noise pixel (e.g., pixel value 1) within a predetermined distance (first distance) from a text region pixel indicated by the text region signal (as shown in (a) of FIG. 10) is to be replaced with (ii) another pixel (e.g., pixel value 0) other than the line noise pixel (as shown in (b) of FIG. 10). An area within the predetermined distance (first distance) is, in a case where a pixel at an edge of a character is a target pixel, an area of eleven pixels×eleven pixels centered around the target pixel. (a) of FIG. 10 is an explanatory view of an example of the mask image data generated by the mask image generation section 65 shown in FIG. 3. (b) of FIG. 10 is an explanatory view of an example of the line noise replacement mask generated from the mask image data shown in (a) of FIG. 10.

According to the examples shown in (a) and (b) of FIG. 10, line noise pixels (pixel value 1) within the area of eleven pixels×eleven pixels centered around the text region pixel are replaced with pixels (pixel value 0) other than the line noise pixels. The area within which the line noise pixels are to be replaced with other pixels can be determined previously with use of a lot of image samples so that the character is represented clearly.

(Operation of Line Noise Replacement Process Section)

The line noise replacement process section 53 replaces line noise pixels, on the basis of the line noise replacement mask generated by the mask correction section 52. Specifically, as described earlier, the line noise replacement mask indicates line noise pixels to be replaced (replacement-target line noise pixels) when line noise included in input image data is to be removed. The line noise replacement process section 53 changes pixel values of the replacement-target line noise pixels indicated by the line noise replacement mask so that the line noise is removed. Such a replacement process is carried out by (i) selecting a most suitable pixel from the input image data on the basis of for example similarity and (ii) replacing, with a selected pixel, a pixel to be replaced. The line noise replacement process section 53 can employ for example the technique disclosed in Patent Literature 2.

The following description specifically discusses the operation of the line noise replacement process section 53, with reference to FIGS. 11 and 12. FIG. 11 is an explanatory view of the operation of the line noise replacement process section 53. FIG. 12 is a flowchart showing the operation of the line noise replacement process section 53.

As illustrated in for example FIG. 11, the line noise replacement process section 53 sets, in input image data (image to be processed), a similarity calculation mask which includes fifteen pixels×fifteen pixels centered around a line noise pixel to be replaced (S51).

Next, the line noise replacement process section 53 scans, by using, as a template, an area that has the same size as the similarity calculation mask, all pixels of the input image data (image to be processed). In this way, the line noise replacement process section 53 carries out a matching process to find whether pixels of the input image data, which pixels are within the template, match their corresponding pixels in the similarity calculation mask (S52).

Specifically, the line noise replacement process section 53 calculates a difference between (i) a pixel value of each of the pixels in the similarity calculation mask of fifteen pixels× fifteen pixels centered around a line noise pixel to be subjected to matching (replacement-target line noise pixel) and (ii) a pixel value of a pixel in the template, which pixel is in a location corresponding to the each of the pixels in the similarity calculation mask. Next, the line noise replacement process section 53 finds the sum of absolute values of differences found in the entire template. The sum found here is used as similarity, of a pixel area in that position of the template, to the line noise pixel to be subjected to matching. The similarity becomes greater as the sum becomes smaller.

When calculating the similarity, the line noise replacement process section 53 does not calculate differences if there is a line noise pixel within the template. Further, the line noise replacement process section 53 does not carry out matching (does not calculate differences) if, at an edge of the image, the template lies off the edge of the image. Note here that a pixel value of a pixel in a region outside the image can be replaced with a pixel value of a pixel of an image at the edge.

Next, the line noise replacement process section 53 selects, as a pixel value of an replacement-target line noise pixel in the similarity calculation mask, a pixel value of a pixel of the input image data, which pixel is (i) within a position of the template which position has the highest similarity and (ii) in a location corresponding to a location of the replacement-target line noise pixel. After that, the line noise replacement process section 53 replaces the pixel value of the replacement-target line noise pixel in the similarity calculation mask with the pixel value of a selected pixel (S53).

Next, the line noise replacement process section 53 determines whether the processes of S51 to S53 have been carried out with respect to all replacement-target line noise pixels (S54). If the line noise replacement process section 53 has determined that the processes have been carried out with respect to all the replacement-target line noise pixels, then the process ends. On the other hand, if the line noise replacement process section 53 has determined that the processes have not been carried out with respect to all the replacement-target line noise pixels, then the process returns to S51 and the processes of S51 to S54 are repeated.

The above processes carried out by the line noise replacement process section 53 are examples, and therefore are not limited to those described above. That is, any process can be employed provided that the line noise replacement process section 53 (i) selects, from input image data (image to be processed), a pixel most suitable for a replacement-target line noise pixel and (ii) replaces the replacement-target line noise pixel with a selected pixel.

Note that the line noise replacement process section 53 is arranged not to carry out replacement of a replacement-target line noise pixel in a case where the pixel selected as a replacement pixel (i.e., a pixel used for replacement) for replacement of the replacement-target line noise pixel is a line noise pixel. The line noise replacement process section 53 can be arranged not to carry out (arranged to terminate) the replacement of the replacement-target line noise pixel in a case where the pixel selected as a replacement pixel for replacement of the replacement-target line noise is a pixel in a text region.

The line noise replacement process section 53 can be arranged to set, in descending order of similarity, a plurality of candidates (the first candidate, the second candidate, and so on) for a replacement pixel for replacement of a replacement-target line noise pixel. In this case, the line noise replacement process section 53 uses, as a replacement pixel for replacement of the replacement-target line noise pixel, a candidate that (i) is neither a line noise pixel nor a pixel in a text region and (ii) has the highest priority. For example, in a case where (a) the first candidate is not "a pixel that is neither a line noise pixel nor a pixel in a text region" and (b) the second candidate is "a pixel that is neither a line noise pixel nor a pixel in a text region", then the line noise replacement process section 53 replaces the replacement-target line noise pixel with the second candidate.

Such an arrangement makes it possible to prevent a deterioration in image quality which may be caused by inappropriate replacement of the replacement-target line noise pixel. Specifically, the line noise replacement mask generated by the mask correction section 52 is targeted for pixels other than (i) pixels in a text region and (ii) pixels within a first distance from a pixel in the text region (the first distance is, in a case where a pixel at an edge of a character is a target pixel, a predetermined distance from the target pixel (e.g., within an area of eleven pixels×eleven pixels)). For this reason, it is inappropriate that a pixel in the text region is selected as a replacement pixel for replacement of the replacement-target line noise pixel. This should be considered as a malfunction of the line noise removal process section.

In the case where the line noise replacement process section 53 is arranged to appropriately set, in descending order of similarity, a plurality of candidates (the first candidate, the second candidate, and so on) for a replacement pixel for replacement of a replacement-target line noise pixel as described above, the line noise replacement process section 53 can further have the following configuration. Specifically, the line noise replacement process section 53 can be arranged to select, as a replacement pixel, a candidate that (i) is neither a pixel in a text region nor a pixel within a second distance from a pixel in the text region (the second distance is, in a case where a pixel at an edge of a character is a target pixel, a predetermined distance from the target pixel (e.g., within an area of eleven pixels×eleven pixels)) and (ii) has the highest similarity.

Such an arrangement makes it possible to replace, even if for example the first candidate for a replacement pixel is a pixel within a text region, a replacement-target line noise pixel with the second candidate which is not a pixel within the text region. Further, since pixels within the second distance from a pixel in the text region are excluded from the candidates for a replacement pixel, it is possible to prevent the replacement-target line noise pixel from being replaced with a pixel in the actual text region. In the above example, values of the first distance and the second distance are set to the same value. Note, however, that the values can be set as appropriate on the basis of various image samples so that a poor edge shape of a character is suppressed and line noise is appropriately removed.

The following description discusses a document feed double-side reading apparatus (image reading apparatus) used as the image input apparatus 11. FIG. 13 is a longitudinal cross sectional view schematically illustrating a structure of the document feed double-side reading apparatus serving as the image input apparatus 11 shown in FIG. 1.

As illustrated in FIG. 13, the document feed double-side reading apparatus 200 includes a lower housing 201, an upper housing 202 and a paper output tray 203. The document feed double-side reading apparatus 200 is arranged to be capable of reading an image of a document sheet in (i) a static-sheet reading mode in which an image is read while a document sheet is stationary, (ii) a sheet-feed reading mode in which an image is read while a document sheet is being conveyed and (iii) a double-side reading mode in which images on both sides of a document sheet are read while the document sheet is being conveyed.

Selection of a reading mode is carried out on the input apparatus 18 of the image forming apparatus, on which input apparatus 18 a user carries out various settings and input of instructions. A selected reading mode is transmitted as a reading mode signal. Note that the document feed double-side reading apparatus 200 is set to, when a copy button is pressed while a document sheet is in a document tray 222 (i.e., while a document sheet is being detected by a document detection sensor), read an image of the document sheet in the sheet-feed reading mode. When the image is to be read in the double-side reading mode, the double-side reading mode is selected on the input apparatus 18.

The document feed double-side reading apparatus 200 is arranged such that (i) when a document sheet is placed on a scanner platen 211, the size of the document sheet is inside the lower housing 201 or near the scanner platen 211 and then (ii) when the copy button is pressed, the document sheet is read in the static-sheet reading mode.

The document feed double-side reading apparatus 200 is arranged to read an image of a document sheet by (i) using a first reading section (an optical system for reading a back (rear) side) 210 inside the lower housing 201 in the static-sheet reading mode and (ii) using a second reading section (an optical system for reading a front side) 223 inside the upper housing 202 in the sheet-feed reading mode.

Further, the document feed double-side reading apparatus 200 is arranged to simultaneously use both the first reading section 210 and the second reading section 223 in the double-side reading mode.

The lower housing 201 includes the first reading section 201 and the scanner platen 211. The first reading section 210 includes a first scanning unit 212, a second scanning unit 213, an image focusing lens 214, a CCD 215 and a contact glass 216.

The scanner platen 211 is a platen on which a document sheet to be read in the static-sheet reading mode is to be placed. The first scanning unit 212 causes the document sheet to be exposed to light while moving from left to right along the scanner platen 211 at a regular speed V. To achieve this, the first scanning unit 212 includes (i) a light source lamp 250 and (ii) a first reflection mirror 251 for directing light reflected from the document sheet toward the second scanning unit 213.

The second scanning unit 213 is arranged to move at a speed V/2 while following the first scanning unit 212, and includes a second reflection mirror 252 and a third reflection mirror 253 which guide light from the first reflection mirror 251 to the image focusing lens 214 and the CCD 215.

The image focusing lens 214 causes the light, reflected from the third reflection mirror 253, to be focused into image on the CCD 215. The CCD 215 converts, into analog electric signals, the light from the image focusing lens 214. The analog electric signals are converted by the image processing apparatus 12 into digital image data.

The first reading section 210 is configured to read (i) an image of a document sheet placed on the scanner platen 211 and (ii) an image of a document sheet which is being conveyed by members of the upper housing 202.

When the first scanning unit 212 is to read a document sheet on the scanner platen 211, the first scanning unit 212 moves in a direction from the position indicated by Pos1 to the position indicated by Pos2 shown in FIG. 13 by a distance corresponding to the size of the document sheet detected by document size detecting means (not illustrated). On the other hand, when the first scanning unit 212 is to read a document sheet which is being conveyed, the first scanning unit 212 is stationary in the position indicated by Pos3. Further, while the document feed double-side reading apparatus 200 is not used (i.e., in a standby state), the first scanning unit 212 is stationary in its home position Pos0 (not illustrated) between the position indicated by Pos1 and the position indicated by Pos3.

The second reading section 223 reads an image of a document sheet placed on the document tray 222, and includes a document conveying section 231, an image sensor section 232, a document conveying path 233 and a document discharging section 234.

The document conveying section 231 causes a document sheet placed on the document tray 222 to be conveyed through the document conveying path 233. The image sensor section 232 reads an image of the document sheet which is being conveyed. The document discharging section 234 is provided for discharging, to the paper output tray 203, a document sheet whose image has been read by the image sensor section 232.

The document conveying section 231 includes an assistant feeding roller 261, a document detection sensor 262, a document pressing board 263, a friction pad 264, a feeding timing sensor 265, a feeding roller 266, and a pair of alignment rollers 267.

The assistant feeding roller 261 and the document pressing board 263 cause a document sheet detected by the document detection sensor 262 to be conveyed into the second reading section 223. The friction pad 264, the feeding roller 266 and the pair of alignment rollers 267 cause conveyed document sheets to be directed, sheet by sheet, toward the image sensor section 232 on the basis of a result detected by the feeding timing sensor 265.

Note that a drive shaft of the pair of alignment rollers 267 includes an electromagnetic clutch (not illustrated) so as to control communication of a drive force from a drive motor (not illustrated). While no document sheet is detected, the pair of alignment rollers 267 are stopped. The pair of alignment rollers 267 is arranged to be rotated, when a leading end of a document sheet is brought into contact with the feeding timing sensor 265 and a predetermined signal is transmitted from the feeding timing sensor 265, in a direction in which the document sheet is conveyed downstream.

While the pair of alignment rollers 267 is stopped, when the leading end of a document sheet that has been conveyed from upstream by the friction pad 264 and the feeding roller 266 runs into a nip area of the pair of alignment rollers 267, the document sheet is caused to have a predetermined bent. After that, the pair of alignment rollers 267 is rotated so as to convey the document sheet downstream. Here, the document sheet is aligned by the nip area of the pair of alignment rollers 267 so that the leading end of the document sheet is orthogonal to a direction in which the document sheet is conveyed. The pair of alignment rollers 267 and the contact glass 216 constitute a part of the document conveying path 33.

The document discharging section 234 includes a pair of document discharge rollers 269 and a document discharge sensor 259. An upper roller of the pair of document discharge rollers 269 is a driving roller which is integrally provided in a left portion of the upper housing 202, and is driven by a drive mechanism inside the upper housing 202. The upper roller and a lower roller (driven roller) of the pair of document discharge rollers 269, which lower roller is rotatably provided on the lower housing 201 side, convey a document sheet that has passed through the document conveying path 233 while nipping the document sheet and discharge the document sheet onto the paper output tray 203.

The document discharge sensor 259 is provided downstream from the pair of document discharge rollers 269, and informs a reading control section (described later) that a document sheet has been discharged.

The image sensor section (CIS: Contact Image Sensor) 232 is provided to the upper housing 202, and reads an image on an upper surface of a document sheet which is being conveyed through the document conveying path 233. Note here that a cover 224 is configured such that, when it is open, an area above the image sensor section 232 is accessible.

The following description discusses operation of the document feed double-side reading apparatus 200 configured like above.

The document feed double-side reading apparatus 200 is configured such that, in the static-sheet reading mode, only a one-side (single-side) reading mode is selectable and the first reading section 210 only is used to read a document sheet. Note here that the first scanning unit 212 of the first reading section 210 first lies in its home position (Pos0 (not illustrated) between Pos3 and Pos1 shown in FIG. 13). Then, in response to instructions from the reading control section, the first scanning unit 212 moves from the position indicated by Pos1 toward the position indicated by Pos2 together with the second scanning unit 213 while scanning a document sheet placed on the scanner platen 211. This makes it possible to cause the CCD 215 to receive reflected light corresponding to an image of the document sheet. In this way, the first reading section 210 reads an image formed on a lower surface (front side) of the document sheet which is stationary.

In the sheet-feed reading mode, either the one-side reading mode or a double-side reading mode can be selected by a user. In the one-side reading mode of the sheet-feed reading mode, in a case where an image is read from only one side of a document sheet, only the first reading section 210 needs to be used to read the document. In this case, the first scanning unit 212 of the first reading section 210 moves from the home position Pos0 to the position indicated by Pos3, and stops at the position indicated by Pos3. Then, the first scanning unit 12, which is stationary, reads a document sheet which is being conveyed. Then, in response to instructions from the reading control section, the CCD 215 reads, from underneath through the contact glass 216, an image of the document sheet which is being conveyed through the document conveying path 233. That is, the first reading section 210 reads an image formed on a lower surface (front side) of the document sheet.

In the double-side reading mode of the sheet-feed reading mode, both the first reading section 210 and the image sensor section 232 are used to read a document sheet. Note here that the first scanning unit 212 of the first reading section 210 is stopped in the position indicated by sheet-feed reading mode.

Then, in response to instructions from the reading control section, the first reading section 210 reads, from underneath through the contact glass 216, an image of a document sheet which is being conveyed through the document conveying path 233. Similarly, the image sensor section 232 reads, from the above, an image formed on an upper surface (back side) of the document sheet which is being conveyed.

As has been described, the document feed double-side reading apparatus 200 is configured such that, in the double-side reading mode, the first reading section 210 and the second reading section 223 simultaneously read, from the above and underneath, the images on the front and back sides of a document sheet which is being conveyed.

As has been described, according to the present embodiment, it is possible to prevent a poor edge shape from appearing in a character when carrying out a process to remove line noise pixels (line noise) included in input image data.

(Description of Program and Recording Medium in which Program is Stored)

Each block of the image processing apparatus 12 shown in FIG. 1, particularly the segmentation process section 25 and the line noise removal section 27, can be realized by a hardware logic or can be realized by a CPU and software as follows.

Specifically, the image processing apparatus 12 includes for example (i) a CPU (central processing unit) which executes commands of a control program for realizing each function, (ii) a ROM (read only memory) in which the program is stored, (iii) a RAM (random access memory) in which the program is deployed, and (iv) a storage device (recording medium), such as a memory, in which the program and various kinds of data are stored. It is possible to attain the object of the present invention also by (i) providing, to the image processing apparatus 12, a recording medium in which computer-readable program codes (execution mode program, intermediate code program, and source program) of a control program of the image processing apparatus 12 are stored, which control program serves as software for realizing the foregoing functions, (ii) causing the computer (or CPU or MPU) to read out the program codes stored in the recording medium, and (iii) causing the computer (or CPU or MPU) to execute the program codes.

Examples of the recording medium include: tapes such as a magnetic tape and a cassette tape; disks such as magnetic disks (e.g., a floppy (registered trademark) disk and a hard disk) and optical discs (e.g., CD-ROM, MO, MD, DVD, and CD-R); cards such as an IC card (including a memory card) and an optical card; and semiconductor memories such as a mask ROM, EPROM, EEPROM and flash ROM.

The image processing apparatus 12 can be arranged so as to be connectable with a communication network, and the program codes can be supplied via the communication network. The communication network is not particularly limited, and examples of the communication network include the Internet, an intranet, an extranet, LAN, ISDN, VAN, a CATV communication network, a virtual private network, a telephone network, a mobile communication network, and a satellite communication network. Furthermore, a transmission medium constituting the communication network is not particularly limited, and examples of the transmission medium include: wired transmission media such as IEEE1394, a USB, a power-line carrier, a cable TV line, a telephone line, and an ADSL; and wireless transmission media such as infrared rays (e.g., IrDA and a remote control), Bluetooth (registered trademark), 802.11 wireless, an HDR, a mobile phone network, a satellite line, and a digital terrestrial network. Note that the present invention can be realized also in the form of a computer signal which (i) has the program codes embodied by electronic transmission and (ii) is embedded in a carrier wave.

As has been described, an image processing apparatus of the present invention includes: a line noise detection section for detecting line noise pixels included in input image data; a segmentation process section for determining at least a pixel in a text region of the input image data; and a line noise removal process section for (i) finding a replacement-target line noise pixel by excepting, from the line noise pixels, the pixel in the text region and a pixel within a first distance from the pixel in the text region and (ii) replacing the replacement-target line noise pixel with another pixel other than the line noise pixels, which another pixel is included in the input image data.

An image processing method of the present invention includes the steps of: (a) detecting line noise pixels included in input image data; (b) determining at least a pixel in a text region of the input image data; and (c) determining an replacement-target line noise pixel by excepting, from the line noise pixels, the pixel in the text region and a pixel within a first distance from the pixel in the text region and replacing the replacement-target line noise pixel with another pixel other than the line noise pixels, which another pixel is included in the input image data.

For example, assume that an image of a document sheet which is carried by an auto document feeder is read to obtain read image data. In this case, if there is dust or paper dust on a glass surface on a path of light for reading the document, the read image data will have line noise that is in parallel with a sub scanning direction (such an image is referred to as a line noise image).

According to the above configuration, the line noise detection section (the step (a)) detects, from input image data made up of such read image data, line noise pixels included in the input image data. The segmentation process section (the step (b)) determines at least a pixel in a text region of the input image data. The line noise removal process section (the step (c)) determines a replacement-target line noise pixel by excepting, from the line noise pixels, the pixel in the text region and a pixel within a first distance from the pixel in the text region and replaces the replacement-target line noise pixel with another pixel other than the line noise pixels, which another pixel is included in the input image data.

This makes it possible to prevent occurrence of poor edge shapes of texts when line noise pixels (line noise) are to be removed from the input image data. Further, since pixels within the first distance from the pixel in the text region are excluded from candidates for the replacement-target line noise pixel, it is possible to prevent a line noise pixel from being replaced with a pixel in the text region.

The image processing apparatus can be configured such that the line noise removal process section includes: a mask image generation section for generating mask image data which indicates locations of the line noise pixels and locations of pixels other than the line noise pixels in the input image data; a mask correction section for generating a line noise replacement mask from the mask image data by correcting, to a non-replacement-target line noise pixel that does not need to be replaced, at least one, of the line noise pixels, which is other than the replacement-target line noise pixel; and a line noise replacement process section for replacing, with the another pixel which is other than the line noise pixels and is included in the input image data, the replacement-target line noise pixel of the input image data, which replacement-target line noise pixel is indicated by the line noise replacement mask.

According to the configuration, the mask image generation section of the line noise removal process section generates the mask image data which indicates locations of the line noise pixels and locations of pixels other than the line noise pixels in the input image data. The mask correction section generates a line noise replacement mask from the mask image data by correcting, to a non-replacement-target line noise pixel that does not need to be replaced, at least one of the line noise pixels which is other than the replacement-target line noise pixel. The line noise replacement process section replaces, with the another pixel which is other than the line noise pixels and is included in the input image data, the replacement-target line noise pixel of the input image data, which replacement-target line noise pixel is indicated by the line noise replacement mask.

This enables the line noise removal process section to easily carry out, with use of the line noise replacement mask, a process to replace a replacement-target line noise pixel of the input image data, which replacement-target line noise pixel is indicated by the line noise replacement mask, with another pixel which is other than the line noise pixel and is included in the input image data.

The image processing apparatus can be configured such that the line noise removal process section: sets a first block including a plurality of pixels centered around the replacement-target line noise pixel; scans the input image data by using, as a template, an area that has the same size as the first block; for each position of the template, finds similarity between (i) the plurality of pixels in the first block and (ii) corresponding pixels in the template; selects, as a replacement pixel, a pixel in a position of the template which position has the highest similarity; and replaces the replacement-target line noise pixel with the replacement pixel.

According to the configuration, the line noise removal process section sets a first block including a plurality of pixels centered around the replacement-target line noise pixel. Next, the line noise removal process section scans the input image data by using, as a template, an area that has the same size as the first block. Next, the line noise removal process section finds, for each position of the template, similarity between (i) the plurality of pixels in the first block and (ii) corresponding pixels in the template, and selects, as a replacement pixel, a pixel which is in a position of the template which position has the highest similarity. Then, line noise removal process section replaces the replacement-target line noise pixel with the replacement pixel.

This makes it possible to remove, even from a pattern region such as a halftone dot region, line noise appropriately without leaving an unusual-looking portion in the texture.

The image processing apparatus can be configured such that, in a case where the replacement pixel is the pixel in the text region, the line noise removal process section terminates a process of replacing the replacement-target line noise pixel with the replacement pixel.

According to the configuration, in a case where a selected replacement pixel is the pixel in the text region, the line noise removal process section terminates a process of replacing the replacement-target line noise pixel with the replacement pixel.

This makes it possible to prevent a deterioration in image quality which may be caused by inappropriate replacement of the replacement-target line noise pixel. Specifically, according to the line noise removal process section, a replacement-target line noise pixel is determined by excepting a pixel in a text region and a pixel within the first distance from the pixel in the text region. Therefore, it is inappropriate that a pixel in the text region is selected as a replacement pixel for replacement of the replacement-target line noise pixel. This makes it possible to prevent a malfunction of the line noise removal process section.

The image processing apparatus can be configured such that the line noise removal process section: sets, in descending order of the similarity, a plurality of pixels serving as candidates for the replacement pixel; and selects one of the candidates as the replacement pixel, which one of the candidates (i) is not the pixel in the text region and (ii) has the highest similarity.

According to the configuration, the line noise removal process section sets, in descending order of the similarity, a plurality of pixels serving as candidates for the replacement pixel. Furthermore, the line noise removal process section selects one of the candidates as the replacement pixel, which one of the candidates (i) is not the pixel in the text region and (ii) has the highest similarity.

This makes it possible, even in a case where for example the first candidate for the replacement pixel is a pixel in the text region, to replace the replacement-target line noise with the second candidate which is not a pixel in the text region. Accordingly, it is possible to unfailingly carry out a process of replacing a replacement-target line noise pixel with a replacement pixel. Further, it is possible to remove, even from a pattern region such as a halftone dot region, line noise appropriately without leaving an unusual-looking portion in the texture.

The image processing apparatus can be configured such that the line noise removal process section: sets, in descending order of the similarity, a plurality of pixels serving as candidates for the replacement pixel; and selects one of the candidates as the replacement pixel, which one of the candidates (i) is not the pixel in the text region, (ii) is not a pixel within a second distance from the pixel in the text region and (iii) has the highest similarity.

According to the configuration, the line noise removal process section selects one of the candidates as the replacement pixel, which one of the candidates (i) is not the pixel in the text region, (ii) is not a pixel within a second distance from the pixel in the text region and (iii) has the highest similarity.

This makes it possible, even in a case where for example the first candidate for the replacement pixel is a pixel in the text region, to replace the replacement-target line noise with the second candidate which is not a pixel in the text region. Further, since pixels within the second distance from the pixel in the text region are excluded from candidates for the replacement pixel, it is possible to prevent a replacement-target line noise pixel from being replaced with a replacement pixel in an actual text region. That is, it is possible to prevent the line noise pixel from being replaced with a pixel in the text region and to prevent poor edge shapes from occurring in texts.

That is, in a case where the segmentation process section detects an edge of a character as a text region, a pixel within the character is not detected as a character. Accordingly, by excluding, from candidates for the replacement pixel, pixels within the second distance (a distance from the edge of a character, within which distance the character exists, e.g., within an area of ten pixels×ten pixels) from the pixel determined by the segmentation process section to be a pixel in the text region, the replacement-target pixel is not replaced with the pixel in the text region.

This makes it possible to unfailingly carry out a process of replacing a replacement-target line noise pixel with a replacement pixel. Further, it is possible to remove, even from a pattern region such as a halftone dot region, line noise appropriately without leaving an unusual-looking portion in the texture. Furthermore, it is possible to prevent a deterioration in image quality of texts.

An image reading apparatus of the present invention includes: a document feed reading apparatus for reading a document while feeding the document to thereby obtain image data; and any of the foregoing image processing apparatuses which treats, as the input image data, the image data obtained by the document feed reading apparatus.

According to the configuration, it is possible for the image processing apparatus to appropriately carry out a process of removing line noise on the basis of data of an image of a document which data has been obtained by the document feed reading apparatus while feeding the document sheet.

The present invention is not limited to the descriptions of the respective embodiments, but may be altered within the scope of the claims. An embodiment derived from a proper combination of technical means disclosed in different embodiments is encompassed in the technical scope of the invention.

Industrial Applicability

The present invention is applicable to an image reading apparatus, a digital copying machine and a digital multifunction peripheral etc.

REFERENCE SIGNS LIST

11 Image input apparatus (image reading apparatus)
12 Image processing apparatus
13 Image output apparatus (printing apparatus)
17 Control section
25 Segmentation process section
27 Line noise removal section
51 Line noise detection section (line noise removal process section)
52 Mask correction section (line noise removal process section)
53 Line noise replacement process section (line noise removal process section)

61 Luminance calculation section
62 Edge detection section
63 Histogram generation section
64 Line noise pixel determination section
65 Mask image generation section (line noise removal process section)

The invention claimed is:

1. An image processing apparatus, comprising:
    a line noise detection section for detecting line noise pixels included in input image data;
    a segmentation process section for determining at least a pixel belonging to a text region of the input image data; and
    a line noise removal process section for (i) determining a replacement-target line noise pixel which is a remaining line noise pixel obtained by excepting, from the line noise pixels,
    (a) a pixel which has been determined as belonging to the text region and (b) a line noise pixel within a first distance from the pixel determined as belonging to the text region and (ii) replacing the replacement-target line noise pixel with another pixel other than the line noise pixels, which another pixel is included in the input image data.

2. The image processing apparatus according to claim 1, wherein the line noise removal process section includes:
    a mask image generation section for generating mask image data which indicates locations of the line noise pixels and locations of pixels other than the line noise pixels in the input image data;
    a mask correction section for generating a line noise replacement mask from the mask image data by correcting, to a non-replacement-target line noise pixel that does not need to be replaced, at least one, of the line noise pixels, which is other than the replacement-target line noise pixel; and
    a line noise replacement process section for replacing, with the another pixel which is other than the line noise pixels and is included in the input image data, the replacement-target line noise pixel of the input image data, which replacement-target line noise pixel is indicated by the line noise replacement mask.

3. The image processing apparatus according to claim 1, wherein the line noise removal process section:
    sets a first block including a plurality of pixels centered around the replacement-target line noise pixel;
    scans the input image data by using, as a template, an area that has the same size as the first block;
    for each position of the template, finds similarity between (i) the plurality of pixels in the first block and (ii) corresponding pixels in the template;
    selects, as a replacement pixel, a pixel which is in a position of the template which position has the highest similarity; and
    replaces the replacement-target line noise pixel with the replacement pixel.

4. The image processing apparatus according to claim 3, wherein, in a case where the replacement pixel is the pixel in the text region, the line noise removal process section terminates a process of replacing the replacement-target line noise pixel with the replacement pixel.

5. The image processing apparatus according to claim 3, wherein the line noise removal process section:
    sets, in descending order of the similarity, a plurality of pixels serving as candidates for the replacement pixel; and
    selects one of the candidates as the replacement pixel, which one of the candidates (i) is not the pixel in the text region and (ii) has the highest similarity.

6. The image processing apparatus according to claim 3, wherein the line noise removal process section:
    sets, in descending order of the similarity, a plurality of pixels serving as candidates for the replacement pixel; and
    selects one of the candidates as the replacement pixel, which one of the candidates (i) is not the pixel in the text region, (ii) is not a pixel within a second distance from the pixel in the text region and (iii) has the highest similarity.

7. An image reading apparatus, comprising:
    a document feed reading apparatus for reading a document while feeding the document to thereby obtain image data; and
    an image processing apparatus recited in claim 1, which image processing apparatus treats, as the input image data, the image data obtained by the document feed reading apparatus.

8. An image forming apparatus, comprising:
    an image processing apparatus recited in claim 1; and
    a printing apparatus for printing, on a sheet, an image based on image data supplied from the image processing apparatus.

9. An image processing method, comprising the steps of:
    (a) detecting line noise pixels included in input image data;
    (b) determining a pixel belonging to a text region of the input image data; and
    (c) determining a replacement-target line noise pixel which is a remaining line noise pixel obtained by excepting, from the line noise pixels, (a) a pixel which has been determined as belonging to the text region and (b) a line noise pixel within a first distance from the pixel determined as belonging to the text region and replacing the replacement-target line noise pixel with another pixel other than the line noise pixels, which another pixel is included in the input image data.

10. A non-transitory computer-readable recording medium in which a control program is stored for causing a computer to function as sections of the image processing apparatus recited in claim 1.

* * * * *